June 19, 1945.  D. E. GARR  2,378,765
VOLTAGE REGULATOR
Filed June 17, 1943
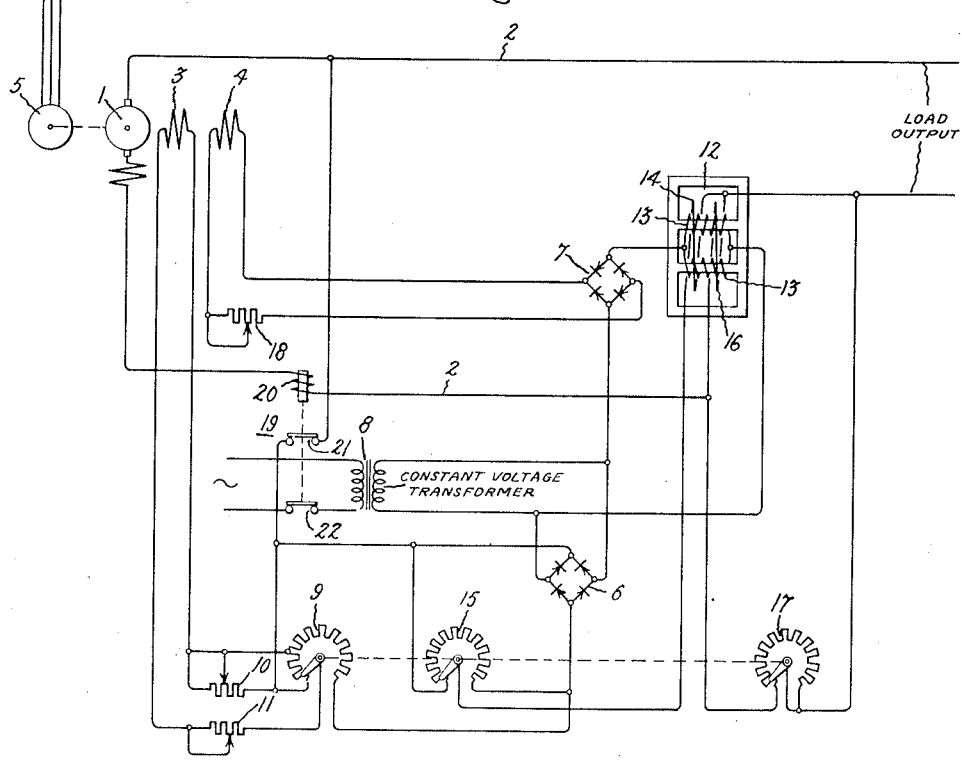
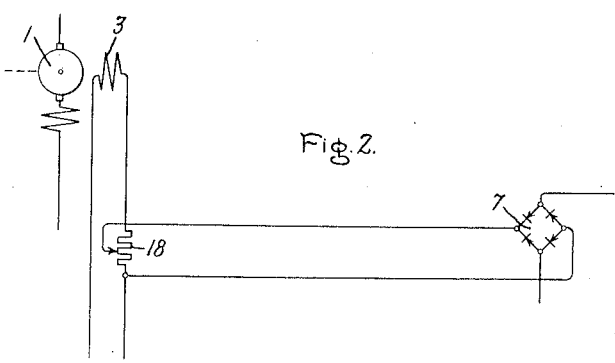
Inventor:
Donald E. Garr,
by Harry E. Dunham
His Attorney.

Patented June 19, 1945

2,378,765

UNITED STATES PATENT OFFICE 2,378,765

VOLTAGE REGULATOR

Donald E. Garr, Schenectady, N. Y., assignor to General Electric Company, a corporation of New York Application June 17, 1943, Serial No. 491,120

20 Claims. (Cl. 171—119)

This invention relates to voltage regulators and more particularly to improvements in static automatic voltage regulator circuits for dynamo-electric machines.

The primary control element of the present regulator circuit is a direct-current saturating reactor. Heretofore such reactors have been used in static automatic voltage regulator circuits for dynamo-electric generators. However, these circuits have left something to be desired in the way of accuracy, range of voltage adjustment, and cost.

In accordance with the present invention there is provided a simple regulator circuit which is accurate within plus or minus two per cent and which is stable over an adjustable range of from one and one-half volts to maximum voltage.

An object of the invention is to provide a novel and simple automatic regulator circuit.

Another object of the invention is to provide an accurate regulator circuit having a wide, stable range of adjustable operation.

The invention will be better understood from the following description taken in connection with the accompanying drawing and its scope will be pointed out in the appended claims.

In the drawing, Fig. 1 illustrates diagrammatically an embodiment of the invention and Fig. 2 is a modification thereof.

Referring now to the single figure of the accompanying drawing, there is shown therein diagrammatically an embodiment of the invention as applied to a generator 1 shown, by way of example, as a direct-current generator having an armature circuit 2 and having a pair of normally cumulatively-acting field windings 3 and 4. The generator may be driven by any suitable means, such for example as a three-phase sixty-cycle driving motor 5. The field winding 3 supplies the base excitation of the machine and occupies about seventy-five per cent of the winding space provided on the machine, while field winding 4 is the control or regulating field and occupies the remaining twenty-five per cent of the winding space on the machine. Both field windings may be energized in any suitable manner and, as shown, they are energized through separate rectifiers 6 and 7 respectively. These rectifiers are shown as of the bridge-connected dry type and their input terminals are connected across the output of a constant voltage transformer 8 which is energized from any suitable supply circuit, such as an ordinary 110-volt sixty-cycle house wiring circuit.

The energization of field winding 3 is adjusted by means of a rheostat 9 and the connections are such that the polarity of the field 3 may be reversed. The magnitude of the reverse polarity voltage which can be impressed on the field is adjusted by a second rheostat 10 and the resistance of the entire field circuit is adjusted by a third rheostat 11. Rheostat 9 is shown in its position for maximum reverse polarity voltage and this reverse polarity voltage is but a fraction of the normal forward polarity voltage whose maximum value is attained when the rheostat is moved to its opposite extreme position from that in which it is illustrated.

The important regulating element of the circuit is a saturable reactor 12 having an alternating-current winding 13 connected between the output of the constant voltage transformer 8 and the input to the rectifier 7. This reactor has a direct-current main control winding 14 for saturating it and this winding is connected across the armature circuit of the generator in series with an adjustable fraction of the rectified constant output voltage of the transformer 8. This adjustable fraction of the rectified constant output voltage of the transformer 8 is obtained from a rheostat 15 which is connected across the rectifier 6. The adjustment is such that at no load the output voltage of the rheostat 15 is slightly above the voltage of the armature circuit of the generator.

For providing automatic current compensation of the regulator system the reactor is also provided with a second direct-current saturating winding 16 which is connected serially in the armature circuit of the regulated genererator. The polarity of the ampere turns of this current winding is the same as the polarity of the ampere turns of the main control or voltage sensitive winding 14 of the reactor.

For adjusting the amount of current compensation a rheostat 17 is connected in shunt circuit relation with the current winding of the reactor.

For adjusting the current in the field winding 4 to the desired value a rheostat 18 is serially connected therewith.

In order to protect the system against overloads a current limit contactor 19 is provided. This has a winding 20 connected in the armature circuit of the generator and has two pairs of normally closed contacts 21 and 22 connected respectively in the circuit of the main voltage responsive control coil 14 of the reactor and in the input circuit to the constant voltage transformer 8.

In order to facilitate changing the voltage level held by the system, all three rheostats 9, 15, and 17 are provided with means for operating them simultaneously. For example, their movable arms may all be mounted on the same shaft so that the three rheostats are gang operated.

The operation of the above-described embodiment of the invention is as follows: As the output voltage of rheostat 15 is higher than the voltage of the armature circuit of the generator, the reactor 12 is partially saturated so that a predetermined amount of current flows through the field 4 which, in combination with the constant current through 3, produces the necessary exciting ampere-turns to maintain the generator voltage at its desired value. If now the generator voltage should fall for any reason the current in the main control winding 14 of the reactor would increase, thus further saturating the reactor and increasing the energization of the field 4 so as to increase the generator voltage. Conversely, an increase in generator voltage above normal will decrease the net voltage on the main control winding 14, thus decreasing its current so that the saturation of the reactor is decreased and therefore the current through the field 4 is decreased with the result that the voltage of the main generator is decreased.

When the changes in voltage are caused by changes in load current, the action of the series winding 16 on the reactor aids the action of the voltage coil so as to produce better regulation and relieve the main control winding 14 of the entire burden of producing the required correction.

Operation of rheostat 9 controls the basic excitation produced by the field 3 so that as its resistance is increased the excitation decreases and the voltage of the main generator tends to decrease except for the fact that the regulator counteracts this tendency and attempts to maintain the voltage constant. By means of the mechanical interconnections between the rheostats the voltage of the rheostat 15 is reduced concurrently with the operation of the rheostat so that the level of voltage held by the automatic saturable reactor regulator falls in proportion to the reduction in voltage which the operation of the rheostat 9 tends to produce.

As the amount of current compensation which is necessary is not as much at low values of voltage as at high values of voltage because the excitation requirements are not as great at low voltage as at high voltage, it is desirable to change the setting of the current compensating means when the voltage level is reduced and for this reason the rheostat 17 is operated simultaneously with the operation of the rheostats 9 and 15.

When the rheostat 9 reverses the polarity of field 3 the voltage of the generator is reduced to very low values, such as one and one-half volts, but the operation is entirely stable because although the net excitation which corresponds to the difference between the ampere-turns on the two field windings is low, the actual current in the regulating field winding 4 is still an appreciable amount.

However the present invention is not limited to two field windings and as is shown in Fig. 2, field winding 4 can be omitted and the output of rectifier 7 can be inserted in the circuit of field winding 3. The effective field ampere-turns of generator 1 will be the same as in Fig. 1 so that the operation will be the same.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a dynamo-electric generator having an armature circuit and a pair of circuits for providing its field excitation, a source of substantially constant voltage connected to energize and actually energizing both of said circuits, and automatic means responsive to the difference between the voltage of said armature circuit and said substantially constant voltage for controlling the energization of one of said circuits independently of the other.

2. In combination, a dynamo-electric generator having an armature circuit and a pair of excitation controlling circuits, a source of substantially constant voltage connected to energize and actually energizing both of said excitation controlling circuits, automatic means responsive to the difference between the voltage of said armature circuit and said substantially constant voltage for controlling the energization of one of said excitation controlling circuits independently of the other, and means responsive to the current in said generator for providing supplemental control of the energization of said one excitation controlling circuit independently of said other excitation controlling circuit.

3. In combination, a dynamo-electric generator having an armature circuit and a pair of field control means, a source of substantially constant voltage connected to energize both of said field control means, and direct-current saturating reactor means responsive to the difference between the voltage of said armature circuit and said substantially constant voltage for controlling the energization of one of said field control means independently of the other.

4. In combination, a dynamo-electric generator having an armature circuit and a pair of field winding energizing means, a source of substantially constant voltage connected to energize both of said means, direct-current saturating reactor means responsive to the difference between the voltage of said armature circuit and said substantially constant voltage for controlling the energization of one of said field winding energizing means independently of the other, and means responsive to the generator current for providing supplemental control of said saturable reactor means.

5. In combination, a dynamo-electric generator having an armature circuit and a pair of cumulatively-acting field winding energizing means, a source of substantially constant voltage connected to energize and actually energizing both of said means, and automatic means responsive to the difference between the voltage of said armature circuit and said substantially constant voltage for controlling the energization of one of said field winding energizing means independently of the other.

6. In combination, a dynamo-electric generator having an armature circuit and a pair of field energizing means, a source of substantially constant voltage connected to energize and actually energizing both of said means, automatic means responsive to the difference between the voltage of said armature circuit and said substantially constant voltage for controlling the energization of one of said field energizing means independently of the other, and means for adjusting the energization of said other field energizing means.

7. In combination, a dynamo-electric generator having an armature circuit and a pair of field exciting means, a source of substantially constant voltage connected to energize and actually energizing both of said exciting means, automatic means responsive to the difference between the voltage of said armature circuit and said substantially constant voltage for controlling the energization of one of said exciting means independently of the other, and means for adjusting the magnitude and polarity of the energization of said other exciting means.

8. In combination, a dynamo-electric generator having an armature circuit and a field winding, a source of substantially constant voltage connected to energize and actually energizing said field winding, and automatic means responsive to the difference between the voltage of said armature circuit and said substantially constant voltage for controlling the energization of said field winding.

9. In combination, a dynamo-electric generator having an armature circuit and a field winding, a source of substantially constant voltage connected to energize and actually energizing said field winding, automatic means responsive to the difference between the voltage of said armature circuit and said substantially constant voltage for controlling the energization of said field winding, and means responsive to the current in said generator for providing supplemental control of the energization of said field winding.

10. In combination, a dynamo-electric generator having an armature circuit and a field winding, a source of substantially constant voltage connected to energize and actually energizing said field winding, automatic means responsive to the difference between the voltage of said armature circuit and said substantially constant voltage for controlling the energization of said field winding, and means for adjusting the effective value of the constant voltage to which said automatic means responds.

11. In combination, a dynamo-electric generator having an armature circuit and a field winding, a source of substantially constant voltage connected to energize and actually energizing said field winding, automatic means responsive to the difference between the voltage of said armature circuit and said substantially constant voltage for controlling the energization of said field winding, means responsive to the current in said generator for providing supplemental control of the energization of said field winding, and means for adjusting the effective setting of said current responsive means.

12. In combination, a dynamo-electric generator having an armature circuit and a field winding, a source of substantially constant voltage connected to energize said field winding, automatic means responsive to the difference between the voltage of said armature circuit and a fraction of said substantially constant voltage for controlling the energization of said field winding, means for adjusting the value of said fraction of said substantitally constant voltage, means responsive to the current of said generator for providing supplemental control of the energization of said field winding, means for adjusting the effectiveness of said current responsive means, and mechanical means for operating both of said adjusting means in unison.

13. In combination, a dynamo-electric generator having an armature circuit and a pair of field exciting means, a source of substantially constant voltage connected to energize and actually energizing both of said exciting means, automatic means responsive to the difference between the voltage of said armature circuit and a fraction of said substantially constant voltage for controlling the energization of one of said exciting means independently of the other, means for adjusting the magnitude and polarity of the energization of the other field winding, and means for adjusting said fractional value of said constant voltage.

14. In combination, a dynamo-electric generator having an armature circuit and a pair of field circuits, a source of substantially constant voltage connected to energize both of said circuits, automatic means responsive to the difference between the voltage of said armature circuit and a fraction of said substantially constant voltage for controlling the energization of one of said circuits independently of the other, means for adjusting the magnitude and polarity of the energization of the other circuit, means for adjusting said fractional value of said constant voltage, and means for operating said two adjusting means together.

15. In combination, a dynamo-electric generator having an armature circuit and a field winding, means including a direct-current saturating reactor for controlling the energization of said field winding, a source of substantially constant voltage, and means responsive to the difference between the voltage of said armature circuit and said substantially constant voltage for controlling the saturation of said reactor.

16. In combination, a dynamo-electric generator having an armature circuit and a field winding, means including a direct-current saturating reactor for controlling the energization of said field winding, a source of substantially constant voltage, means responsive to the difference between the voltage of said armature circuit and said substantially constant voltage for controlling the saturation of said reactor, and means responsive to the armature current of said generator for providing supplemental saturating control of said reactor.

17. In combination, a dynamo-electric generator having an armature circuit and a pair of field exciting means, means including a direct-current saturable core reactor for controlling the energization of one of said exciting means, a source of substantially constant voltage, means responsive to the difference between the voltage of the armature circuit of said generator and said substantially constant voltage for controlling the saturation of said reactor, and means for adjusting the magnitude and polarity of the energization of the other exciting means.

18. In combination, a dynamo-electric generator having an armature circuit and a field winding, means including a direct-current saturating reactor for controlling the energization of said field winding, a source of substantially constant voltage, means responsive to the difference between the voltage of said armature circuit and said substantially constant voltage for controlling the saturation of said reactor, means responsive to the armature current of said generator for providing supplemental saturating control of said reactor, and means for adjusting the setting of said current responsive means.

19. In combination, a dynamo-electric generator having an armature circuit and a pair of field exciting means, means including a direct-current saturable core reactor for controlling the energization of one of said exciting means, a source of substantially constant voltage, means responsive to the difference between the voltage of the armature circuit of said generator and said substantially constant voltage for controlling the saturation of said reactor, means for adjusting the magnitude and polarity of the energization of the other exciting means, and means for adjusting the effective value of said constant voltage.

20. In combination, a direct-current generator having a pair of separately excited field windings, a pair of full-wave rectifiers connected respectively in circuit with each of said field windings, a constant voltage transformer for energizing both of said rectifiers, a saturable core reactor having an alternating-current winding connected between one of said rectifiers and said transformer to the exclusion of the other rectifier, a pair of rheostats connected across the output of said other rectifier, one of said rheostats being connected to control the energization of the field winding which is supplied by said last-mentioned rectifier, a direct-current saturating winding on said reactor, said direct-current saturating winding being connected across said generator through the other rheostat, and means for operating both of said rheostats in unison.

DONALD E. GARR.